United States Patent
Asai et al.

(10) Patent No.: US 7,716,475 B2
(45) Date of Patent: May 11, 2010

(54) MOBILE STATION AND COMMUNICATION CONTROL METHOD

(75) Inventors: Mao Asai, Kawasaki (JP); Tatsuro Oi, Ota-ku (JP); Masaharu Nakatsuchi, Yokohama (JP); Kosuke Kakuno, Yokohama (JP); Akira Shibutani, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1088 days.

(21) Appl. No.: 11/107,751

(22) Filed: Apr. 18, 2005

(65) Prior Publication Data

US 2005/0257052 A1 Nov. 17, 2005

(30) Foreign Application Priority Data

Apr. 28, 2004 (JP) ............................. 2004-134262

(51) Int. Cl.
*H04L 9/00* (2006.01)

(52) U.S. Cl. ........................ 713/166; 713/168; 713/169; 726/1; 726/4; 726/5; 726/7; 726/27

(58) Field of Classification Search .................... 726/27
See application file for complete search history.

(56) References Cited

U.S. PATENT DOCUMENTS

| | | | | |
|---|---|---|---|---|
| 6,771,965 | B2 * | 8/2004 | Hamabe | 455/442 |
| 6,859,879 | B2 * | 2/2005 | Henn et al. | 726/1 |
| 6,901,251 | B1 * | 5/2005 | Kiessling et al. | 455/410 |
| 7,162,277 | B2 * | 1/2007 | Yueh | 455/569.1 |
| 7,475,137 | B2 * | 1/2009 | Holden et al. | 709/225 |
| 2002/0172365 | A1 * | 11/2002 | Nakagomi et al. | 380/270 |
| 2003/0120957 | A1 * | 6/2003 | Pathiyal | 713/202 |
| 2004/0133653 | A1 * | 7/2004 | Defosse et al. | 709/217 |
| 2004/0139349 | A1 * | 7/2004 | Henn et al. | 713/201 |
| 2004/0172536 | A1 * | 9/2004 | Malville et al. | 713/169 |
| 2005/0125664 | A1 * | 6/2005 | Berkema et al. | 713/168 |
| 2005/0132111 | A1 * | 6/2005 | Bar-Or | 710/106 |
| 2005/0180343 | A1 * | 8/2005 | Van Valkenburg | 370/310 |
| 2006/0090200 | A1 * | 4/2006 | Oie | 726/7 |
| 2007/0094714 | A1 * | 4/2007 | Bauban et al. | 726/4 |

FOREIGN PATENT DOCUMENTS

| | | | |
|---|---|---|---|
| CA | 2 482 185 A1 | 10/2003 | |
| EP | 1 150 531 A | 10/2001 | |

(Continued)

*Primary Examiner*—Kambiz Zand
*Assistant Examiner*—Yonas Bayou
(74) *Attorney, Agent, or Firm*—Oblon, Spivak, McClelland, Maier & Neustadt, L.L.P.

(57) ABSTRACT

When an application is activated, a mobile station 10 detects external devices 20, 30, 40 as candidates for a BLUETOOTH connection out of external devices existing in the surrounding area, and presents a list of the devices to a user. When the user selects from the list an external device 20 with which a connection is to be attempted to make, a link is established by a connection procedure according to a security level described in an ADF of the application. Namely, when "high" is described as the security level, an authentication process and an encryption process requiring input of a PIN are executed prior to the establishment of the link. On the other hand, when "low" is described as the security level, a link is established without executing these processes.

13 Claims, 6 Drawing Sheets

FOREIGN PATENT DOCUMENTS

| | | | |
|---|---|---|---|
| EP | 1 158 745 A1 | 11/2001 |
| EP | 1158745 * | 11/2001 |
| GB | 2 348 568 A | 10/2000 |
| JP | 2002-185450 | 6/2002 |
| JP | 2002-281558 | 9/2002 |
| WO | WO 01/08435 A | 2/2001 |

* cited by examiner

Fig.2

| No | APPLICATION | UseBluetooth KEY OF ADF |
|---|---|---|
| 1 | APPLICATION A | "UseBluetooth="<high> |
| 2 | APPLICATION B | "UseBluetooth="<low> |
| 3 | APPLICATION C | "UseBluetooth="<high> |
| 4 | APPLICATION D | "UseBluetooth="<xxx> |
| ⋮ | ⋮ | ⋮ |

Fig.4
(a)
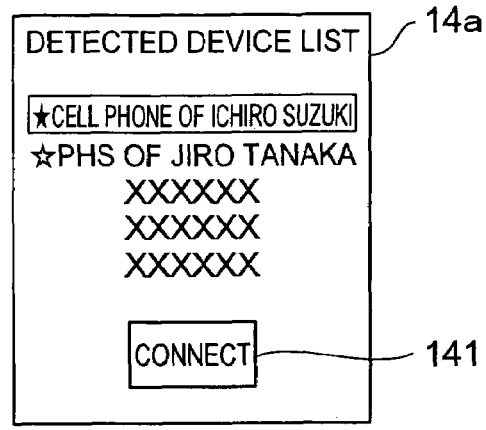
(b)
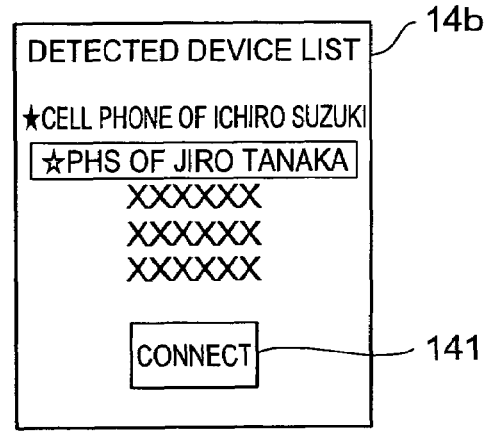
(c)
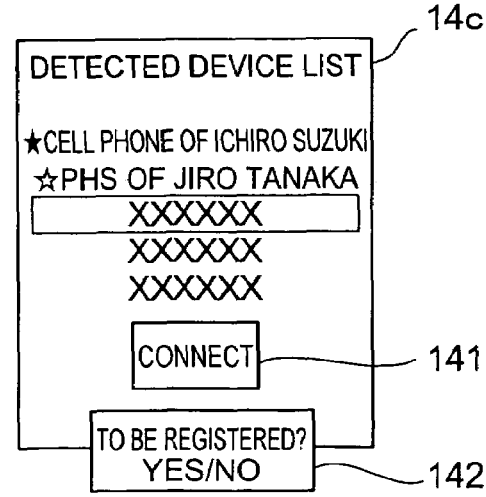

MOBILE STATION AND COMMUNICATION CONTROL METHOD

BACKGROUND OF THE INVENTION

1. Field of the Invention

The present invention relates to a procedure for a mobile station to make a connection with an external device while maintaining a predetermined security level.

2. Related Background Art

Conventionally, the mobile stations including cell phones can enjoy various services, using a preinstalled application program (hereinafter referred to as an "application") or an application downloaded via a network. Some of such services involve transmission and reception of various signals to and from an external device. In this case, the mobile station needs to select a reliable communication partner in order to maintain a predetermined security level during communication. For example, Patent Document 1 is a document that discloses such technology, and it discloses a technical feature of determining the propriety of connection according to a security level of a communication partner.

[Patent Document 1] Japanese Patent Application Laid-Open No. 2002-281558

SUMMARY OF THE INVENTION

However, the aforementioned conventional technology has a problem of concern that, depending upon the security level of the communication partner, the mobile station is not allowed to communicate with the external device in spite of a user's desire. One of effective means for solving this problem is to assure security at a high level, such as input of PIN (Personal Identification Number), for all applications requiring connection with an external device.

In reality, security levels of the respective applications necessary for connection with an external device are different according to types of services desired by the user. For this reason, the setting of the equal security level for all the applications is not always efficient in terms of reducing a processing load and a communication load on the mobile station, a communication time thereof, and so on. Particularly, if the input of PIN is requested even in a connection of the mobile station with an external device not requiring security at a so high level, for example, in a case of connection with a terminal registered in the mobile station, it can contribute to impedance of simple and quick communication.

An object of the present invention is therefore to enable a mobile station to quickly establish communication while maintaining security at a certain level, by changing a connection procedure with an external device, according to a security level set in an application.

In order to solve the above problem, a mobile station according to the present invention comprises: activating means for activating an application to communicate with an external device; acquiring means for acquiring a security level set in the application activated by the activating means; and connection means for making a connection with the external device by a procedure according to the security level acquired by the acquiring means.

A communication control method according to the present invention is a communication control method comprising the following steps carried out by a mobile station: an activating step of activating an application to communicate with an external device; an acquiring step of acquiring a security level set in the application activated in the activating step; and a connection step of making a connection with the external device by a procedure according to the security level acquired in the acquiring step.

According to these aspects of the invention, the connection procedure between the mobile station and the external device is determined according to the security level set in the application for performing communication with the external device. Specifically, when a high security level is set in the activated application, a stricter condition for connection is applied; e.g., the external device is demanded to transmit a PIN. On the other hand, when a low security level is set in the activated application, a looser condition for connection is applied; for example, the request for transmission of a PIN to the external device is omitted. By this configuration wherein the mobile station changes the connection procedure with the external device according to the security level set in the application, the mobile station circumvents indiscriminate execution of complicated authentication and encryption on the occasion of communication with a communication partner not requiring a so high security level, such as a registered external device. As a result, it becomes feasible to quickly establish communication between the mobile station and the external device while maintaining security at a certain level.

The mobile station according to the present invention may be configured in a configuration further comprising selecting means for selecting an external device that can undergo an automatic connection using an application with a high security level set therein, wherein when the security level acquired by the acquiring means is the high security level, the connection means makes the automatic connection with the external device selected by the selecting means.

The connection at the high security level can eliminate connection with unauthorized third parties as much as possible, even in cases where the automatic connection is attempted without intervention of a user operation. According to the present invention, the automatic connection with the external device is executed if the user permits the automatic connection and only if the high security level is set in the application in action. This enables the mobile station to quickly establish communication by the simple procedure without need for a user operation, while maintaining the fixed security level.

The mobile station according to the present invention can also be configured in a configuration further comprising selecting means for selecting an external device that can undergo a connection using an application with a high security level set therein, wherein when the security level acquired by the acquiring means is the high security level, the connection means makes the connection with the external device on the occasion of receiving a connection request from the external device selected by the selecting means.

There possibly exist parties attempting to make unauthorized access among external devices, and it is thus undesirable, in terms of maintaining security, for the mobile station to make connections with unspecified majority of external devices performing a search (connection request) for the mobile station itself. On the other hand, to limit searching entities irrespective of the security levels of applications is inefficient in terms of easiness of connection in execution of an application not requiring a so high security level. Therefore, the mobile station ignores a search from an external device (an unspecified external device) not selected by the user, only if the application under execution is set at the high security level. Then the mobile station accepts only a search from a specific external device selected as connectible, and permits a connection with the device. This eliminates a need for the user of the mobile station to manually send a search response to a search from an external device. As a result, it becomes feasible to reduce the time and effort up to establishment of communication, while maintaining the predetermined security level. Since the mobile station according to the present invention can manage connection targets at the high security level in a lump, it functions more effectively as the number of connection requests from external devices increases.

In the mobile station according to the present invention, preferably, the connection means makes the connection between the mobile station and the external device by use of BLUETOOTH (registered trademark).

The communication used for the connection between the mobile station and the external device is preferably, for example, BLUETOOTH communication. Since BLUETOOTH permits one-to-multiple connections in its standard and can be installed in many types of devices, it has many advantages suitable for consumer products. For this reason, it is necessary to anticipate unauthorized use by third parties on one hand and to adequately consider user's convenience on the other hand. Accordingly, the application of the technology according to the present invention to the BLUETOOTH communication can more effectively bring about the aforementioned effect of enabling quick communication while maintaining the security.

The present invention involves changing the connection procedure with the external device in accordance with the security level set in the application, and thereby enables quick establishment of communication while maintaining security at the predetermined level.

BRIEF DESCRIPTION OF THE DRAWINGS

FIG. 2 is an illustration showing an example of correspondence between applications and security levels of ADFs.

FIG. 4 is an illustration showing a display screen. FIG. 4(a) is an illustration showing a display screen where a registered device with a link key is selected from a list of detected devices displayed on the occasion of executing the BLUETOOTH connection process shown in FIG. 3. FIG. 4(b) is an illustration showing a display screen where a registered device without a link key is selected from the above list. FIG. 4(c) is an illustration showing a display screen where an unregistered device is selected from the above list.

DESCRIPTION OF THE PREFERRED EMBODIMENTS

Figure 1:
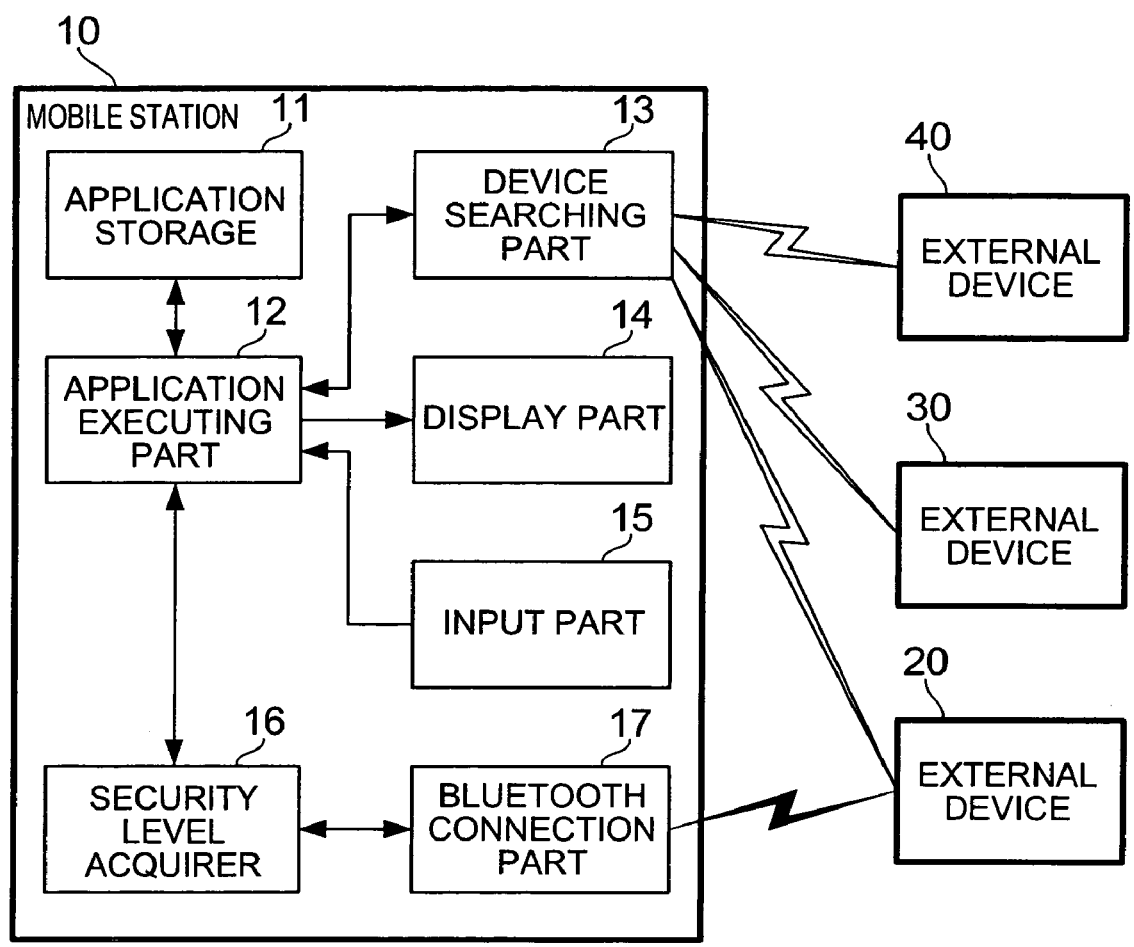
FIG. 1 is a block diagram showing a functional configuration of a mobile station according to the present invention.

An embodiment of the present invention will be described below with reference to the accompanying drawings presented for illustrative purposes. First, a configuration of mobile station 10 in the present embodiment will be described. FIG. 1 is a block diagram showing a functional configuration of mobile station 10. As shown in FIG. 1, the mobile station 10 has an application storage 11, an application executing part 12 (corresponding to the activating means), a device searching part 13, a display part 14, an input part 15 (corresponding to the selecting means), a security level acquirer 16 (corresponding to the acquiring means), and a BLUETOOTH connection part 17 (corresponding to the connection means). These parts are connected so as to be able to implement input/output of various signals through a bus.

Each of the components of the mobile station 10 will be described below in detail.

The application storage 11 is physically comprised of an embedded memory such as an EEPROM (Electrically Erasable and Programmable Read Only Memory). The application storage 11 stores a plurality of application programs that the mobile station 10 can execute by use of BLUETOOTH. The application programs are, for example, those of i-αppli (registered trademark). As shown in FIG. 2, each application program is correlated with an ADF (Application Description File), and a security level is set in each of these ADFs. When executing an application program to make a BLUETOOTH connection, the mobile station 10 changes the procedure of connection according to the security level.

The ADFs of all the application programs making use of BLUETOOTH must contain a description of UseBluetooth key. For example, when a parameter of the UseBluetooth key described in an ADF is "high," the mobile station 10 executes a connection at a high security level, i.e., a connection procedure including the authentication and encryption by input of PIN. On the other hand, when the parameter is "low," the mobile station 10 executes a connection at a low security level, i.e., a connection procedure without the authentication and encryption by input of PIN. The parameter is described in the ASCII format and is case-insensitive.

When the user inputs a command of activating an application, through the input part 15, the application executing part 12 retrieves this application from the application storage 11 into a memory area. When the application is activated in this manner, the application executing part 12 instructs the device searching part 13 to search for external devices. The external devices as targets of the search are external devices that exist within a transmission range (e.g., approximately 10-100 m in radius) of the mobile station 10 and that can undergo a BLUETOOTH connection. In addition, the application executing part 12 outputs the security level described in the ADF of the application in action, in response to a request from the after-described security level acquirer 16.

When receiving a connection command from an application in action, the device searching part 13 sends out a search signal to surroundings (polling) to search for external devices as candidates for BLUETOOTH connection. The aforementioned application executing part 12 is notified of the external devices detected as a result of the search. With reference to FIG. 1, external devices 20, 30, and 40 are detected in the present embodiment, and thus identification information of these devices is outputted from the device searching part 13 to the application executing part 12.

The display part 14 presents the result of the search by the device searching part 13 to the user of the mobile station 10 in accordance with a command from the application executing part 12. Preferably, the display part 14 displays connection records with the detected external devices in a form that the user can visually recognize.

The input part 15 is composed of a button as hardware and, when detecting a push or contact operation on the button by the user, the input part 15 instructs the application executing part 12 to execute the application. The input part 15 performs selection of an external device with which the mobile station 10 attempts to connect, out of the external devices displayed on the display part 14, in accordance with a user's selection operation.

The input part 15 selects a specific external device out of a plurality of external devices registered in advance, in accordance with a selection operation according to a purpose of the user. The specific external device is, for example, an external device as a communication partner when the mobile station 10 performs an automatic connection by use of an application with the high security level set therein. In this case, the mobile station 10 transmits a connection request to the specific external device. The specific external device is also an external device as a communication partner when the mobile station 10 is searched and connected by use of an application with the high security level set therein. In this case, the specific external device transmits a connection request to the mobile station 10.

The security level acquirer 16 asks the application executing part 12 about the security level ("high" or "low") described in the ADF of the application in action to acquire it. The security level acquirer 16 instructs the BLUETOOTH connection part 17 to make a BLUETOOTH connection using a procedure based on the acquired security level.

In accordance with the instruction from the security level acquirer 16, the BLUETOOTH connection part 17 executes the BLUETOOTH connection with the external device selected by the input part 15. For example, where "UseBluetooth="<high> is described as the UseBluetooth key of the ADF of the application in action (cf. FIG. 2), the BLUETOOTH connection part 17 executes a BLUETOOTH connection process including the authentication and encryption.

Next, the operation of the mobile station 10 will be described together with a communication control method according to the present invention. FIGS. 3 to 6 are flowcharts for explaining BLUETOOTH connection processes according to communication partners selected. The BLUETOOTH connection processes are implemented by coordinated operation of the components of the mobile station 10, but FIGS. 3 to 6 are depicted based on classification of process-executing entities into an ordinary application and a native application for convenience' sake of description. The ordinary application is, for example, i-αppli and is described as "application" in the drawings. The native application is, for example, an address book or a browser, and is abbreviated as "native" in the drawings.

As a premise for description of operation, it is assumed in the present embodiment that the external devices 20, 30, and 40 are detected as candidates for a communication partner of BLUETOOTH connection. The external device 20 is a cell phone of Ichiro Suzuki and has a previous connection record at the high security level. Namely, the mobile station 10 contains a link key registered. The external device 30 is a PHS (Personal Handyphone System) of Jiro Tanaka, and has a previous connection record at the low security level only. Therefore, the mobile station 10 contains a device name registered but no link key registered. There is no connection record of the external device 40.

Figure 3:
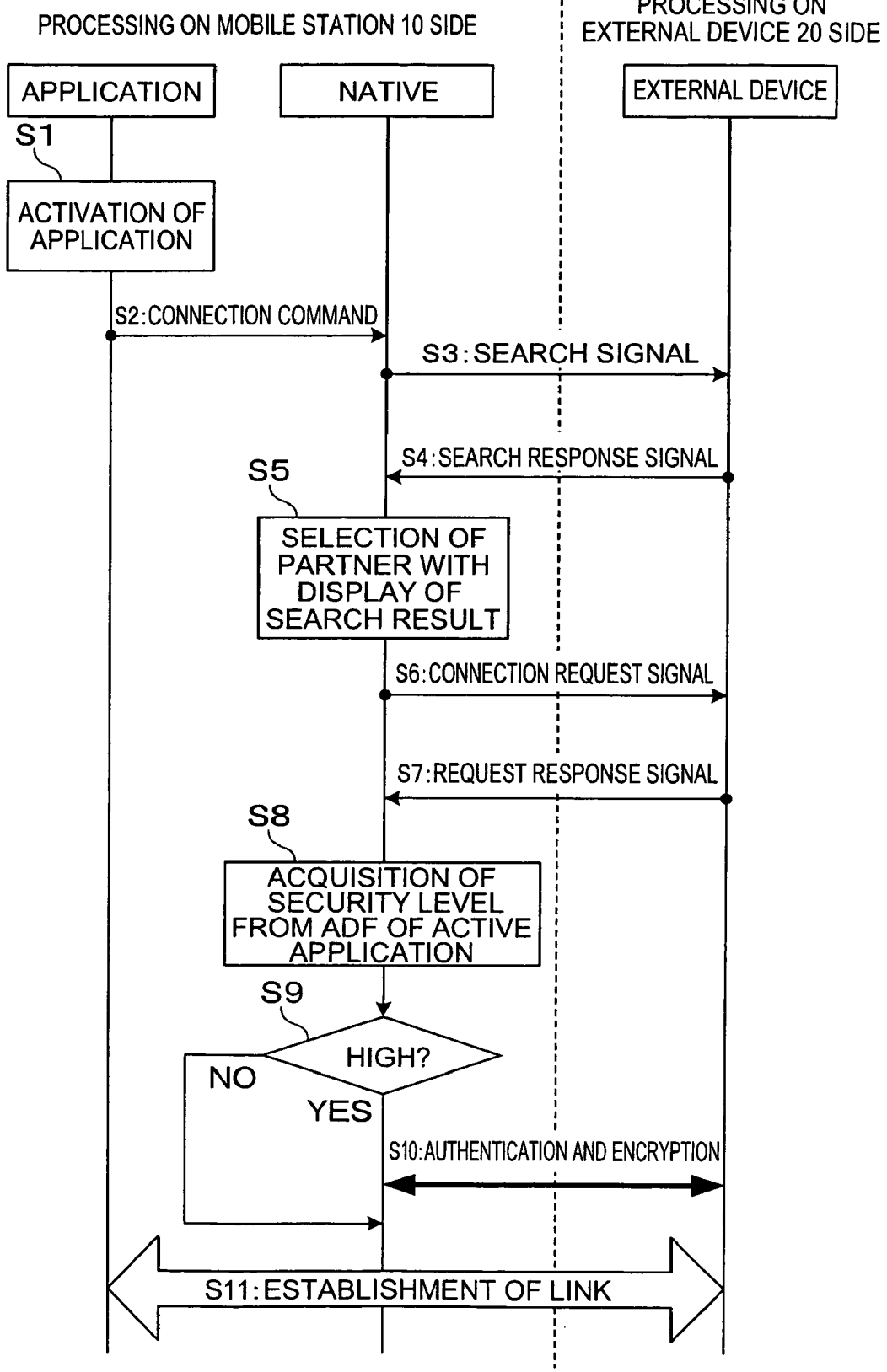
FIG. 3 is a flowchart showing an example of a BLUETOOTH connection process where a registered device with a link key is selected out of detected external devices.

At S1 in FIG. 3, the application executing part 12 of the mobile station 10 first activates an application for providing a service desired by the user. The activation of the application may be automatic activation triggered by detection of an external device or manual activation by a command from the user of the mobile station 10.

At S2, unless there occurs an exception of some kind, the application outputs a command for BLUETOOTH connection (connect(long cod)) to the native. Examples of cases where an exception occurs include a case where the aforementioned UseBluetooth key is not described in the ADF, a case where the parameter of the UseBluetooth key described in the ADF is a character string except for "high" and "low," a case where the BLUETOOTH connection is rejected in the setting of the application, and so on. In these cases where an exception occurs, the mobile station 10 is desirably configured to draw user's attention with its content.

Receiving the connection command, the native sends out a search signal (Inquiry) to search for a plurality of external devices including the external device 20 (S3). Among external devices receiving the search signal, the external devices 20, 30, and 40 capable of BLUETOOTH connection send a search response signal (Inquiry Response) in order to notify the mobile station 10 of the detection (S4).

The native makes the display part 14 display UIs (User Identifications) of the detected external devices, as a result of the search for devices. These external devices are candidates for a communication partner. The user of the mobile station 10 selects the external device 20 as a communication partner desired for BLUETOOTH connection, through the input part 15 (S5). In the present embodiment, the external device 20 corresponds to the cell phone of Mr. Ichiro Suzuki. FIG. 4(a) shows a state of the display part 14 where the "cell phone of Ichiro Suzuki" is selected as a communication partner.

More specifically, the native manages information about communication partners. The information about a communication partner is, for example, BD_ADDR, a device name, a link key, and an encryption key. BD_ADDR is an address specific to each BLUETOOTH connection, which can be displayed for the user, but which cannot be changed by the user (though it can be deleted). The device name is a character string (e.g., cell phone of Ichiro Suzuki) personally registered by the user, which can be subjected to all the processes of display, change, and deletion. The link key is a 128-bit authentication key, and is automatically registered between mobile station 10 and external device 20 upon a connection at the high security level. The link key cannot be displayed for the user but can be deleted by the user. The encryption key is a 128-bit encryption key, and is automatically registered between mobile station 10 and external device 20 upon a connection at the high security level. The encryption key cannot be displayed for the user, but can be deleted by the user only in conjunction with the link key.

Conventionally, BD_ADDR of a communication partner, the device name registered on the partner side, etc. were displayed as UI upon a search for external devices by BLUETOOTH. For this reason, there were problems that it was difficult for the user of the mobile station 10 on the searching side to identify the communication partners and that there was a possibility of spoofing. In the present embodiment, however, the device name registered on the searching side is displayed for each communication partner already registered in a database of the native on the searching side, and a communication partner not registered on the searching side is displayed by its BD_ADDR on the searching side. Therefore, the aforementioned problems are overcome.

Furthermore, for each communication partner having been connected before at the high security level, a link key is registered in the database of the native. In FIG. 4(a), mark ★ indicates a communication partner with a link key, i.e., a communication partner whose device name is registered and with which a connection has been made at the high security level. In contrast to it, mark ☆ indicates a communication partner without a link key, i.e., a communication partner whose device name is registered but with which no connection has been made at the high security level. Furthermore, each UI without any mark ("XXXXXX" in the same figure) indicates a communication partner not registered. By enabling reference to the presence or absence of the link key in combination with each UI in this manner, the user of the mobile station 10 can readily check the reliability of the desired communication partner before establishment of connection. Since the mobile station 10 displays the result of the search for a communication partner on the native screen, it can also be expected to provide the effect of preventing the application from taking the liberty to rewrite BD_ADDR and display the rewritten BD_ADDR.

The user of the mobile station 10 performs a selection operation on a connection button 141 to instruct a connection with the external device 20 selected as a communication partner. Returning to FIG. 3, at S6, as triggered by this instruction, the native transmits a connection request signal (Page) to the external device 20. Receiving the connection request signal, the external device 20 sends a request response signal (PageResponse) to the mobile station 10 (S7).

Thereafter, the mobile station 10 makes the security level acquirer 16 acquire the security level from the ADF of the application activated at S1 (S8). The mobile station 10 refers to the UseBluetooth key described in the ADF to determine whether the security level set in the application is high or low (S9). When the result of the determination is that "UseBluetooth="<high> is described as the UseBluetooth key (S9; YES), the mobile station 10 determines that the security level of the application in action is high, and moves to S10.

At S10, the authentication and encryption processes are carried out between external device 20 as a communication partner and mobile station 10. The processes of authentication and encryption are well-known communication security technologies and thus omitted from detailed description. However, the authentication process is to examine the validity of the communication partner and thereby prevent unauthorized access, and the encryption process is to encrypt transmitted and received data and thereby assure confidentiality of communication. In this case, for the external device 20, the link key thereof is already registered as described above, and thus there is no need for input of PIN in the authentication.

It can also be contemplated that, prior to the execution of the processes at S10, the user of the mobile station 10 preliminarily sets the propriety of automatic connection with each external device under setting of the high security level. This enables the mobile station 10 to refer to the set content and automatically make a connection with an external device permitted to make an automatic connection. Since the automatic connection does not require the user to input a PIN or the like, it is desirably executed only with a reliable communication partner. In this respect, external devices as targets for the automatic connection are limited to devices designated by the user, and communication with the devices is executed at the high security level. For this reason, the automatic connection with high convenience to the user is implemented while assuring high security.

When the result of the determination at S9 is that "UseBluetooth="<low> is described as the UseBluetooth key (S9; NO), the flow goes to a process of S11 without passing the authentication and encryption processes at S10.

At S11, a link is established by BLUETOOTH between mobile station 10 and external device 20. After establishment of the link, a PAN_EVENT_CONNECTED signal is sent to notify the application of the fact. At this time, the mobile station 10 may be configured to present the security level currently applied, during the BLUETOOTH connection. The presentation can be implemented, for example, by adopting a technique of displaying a character string indicating the security level, or a technique of changing the color of an icon indicating a progress of communication, according to the security level. This permits the user to readily and quickly grasp at which security level the communication is under way with the communication partner.

Figure 5:
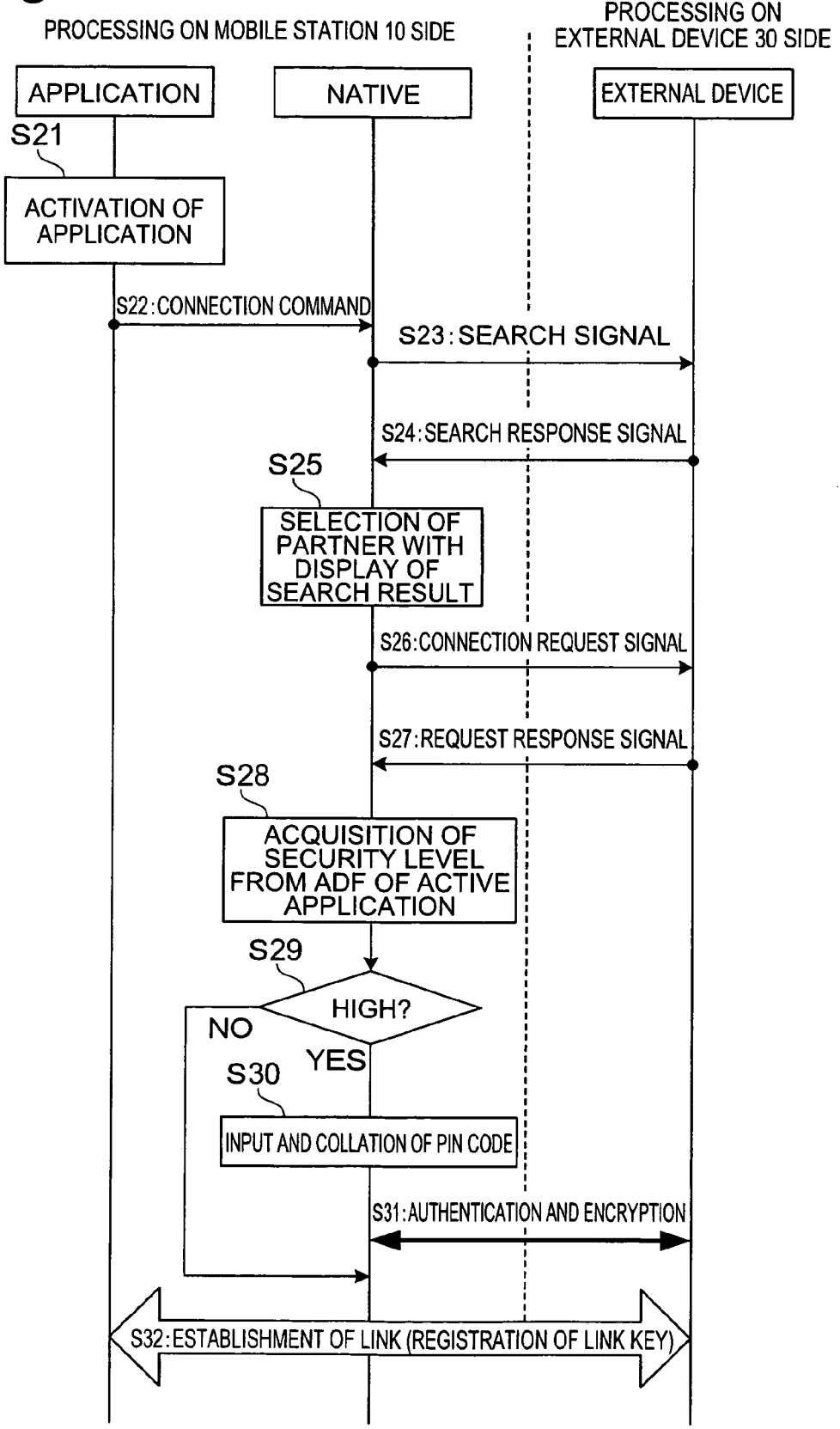
FIG. 5 is a flowchart showing an example of a BLUETOOTH connection process where a registered device without a link key is selected out of detected external devices.

Subsequently, the BLUETOOTH connection process executed between mobile station 10 and external device 30 will be described with reference to FIG. 5. This BLUETOOTH connection process includes a plurality of steps common to the BLUETOOTH connection process detailed with reference to FIG. 3. Specifically, processes at S21-S29, S31, and S32 in FIG. 5 are equivalent to those at S1-S9, S10, and S11, respectively, shown in FIG. 3. However, these processes are somewhat different in detail and, particularly, the communication partner selected at S25 is the PHS of Jiro Tanaka. FIG. 4(b) shows a state of the display part 14 where the "PHS of Jiro Tanaka" is selected as a communication partner.

A process at S30 in FIG. 5 is processes of input and collation of a PIN code, which are executed after the determination on whether the security level is high or low. These processes are executed when the security level is determined to be high (S29; YES), i.e., when "UseBluetooth="<high> is described as the UseBluetooth key of the ADF. Since no link key is registered for the external device 30, the input of a PIN is carried out in the mobile station 10 and a link key is generated based on the input PIN. The link key generated is registered in the mobile station 10 upon establishment of a link (S32). In this manner, the mobile station 10 registers the link key first after a success in authentication (pairing), thereby securing the credibility of the communication partner having the link key.

Figure 6:
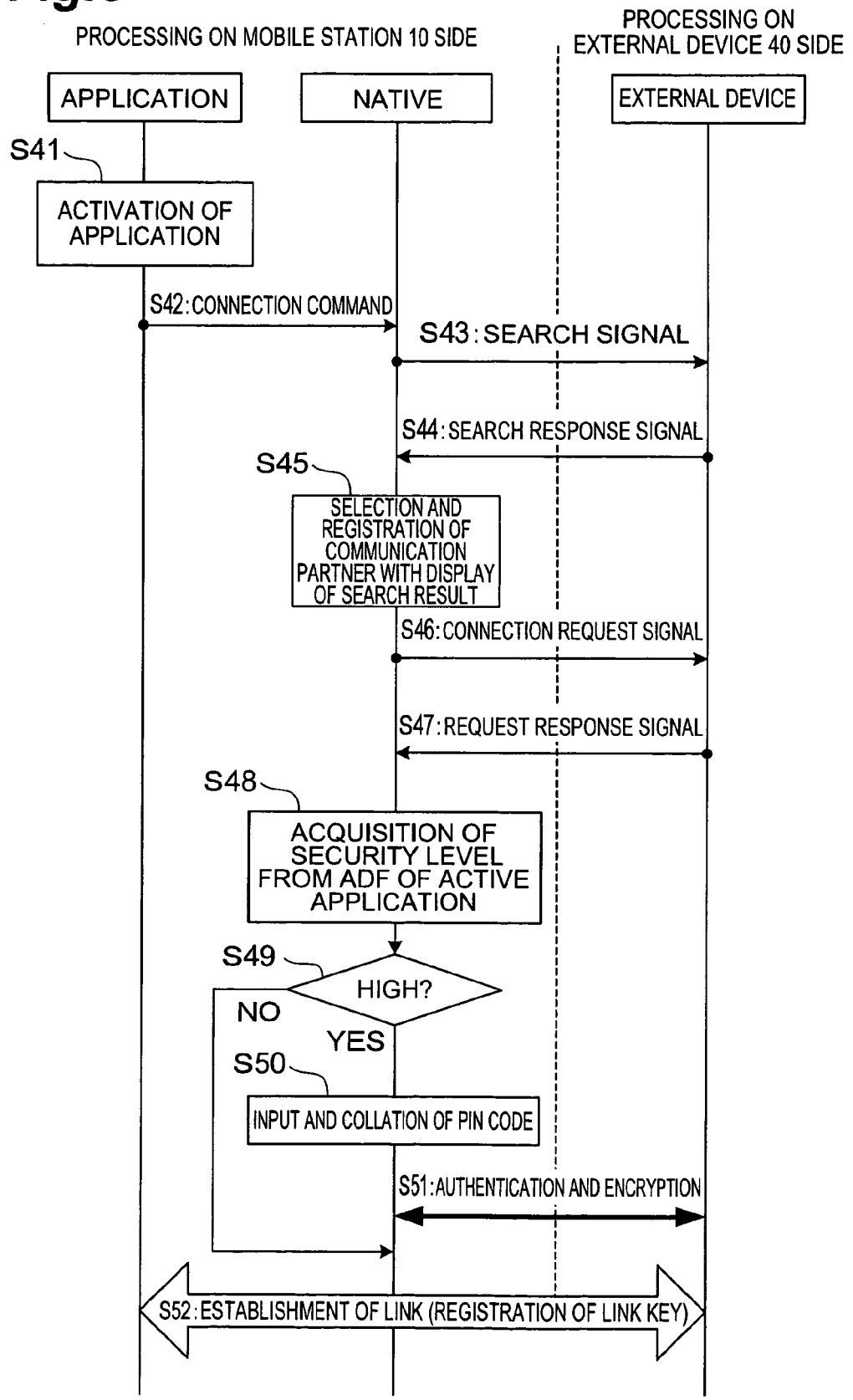
FIG. 6 is a flowchart showing an example of a BLUETOOTH connection process where an unregistered device is selected out of detected external devices.

Next, the BLUETOOTH connection process executed between mobile station 10 and external device 40 will be described with reference to FIG. 6. The BLUETOOTH connection process includes a plurality of steps common to the BLUETOOTH connection process detailed with reference to FIG. 3. Specifically, processes at S41-S49, S51, and S52 in FIG. 6 are equivalent to those at S1-S9, S10, and S11, respectively, shown in FIG. 3. However, these processes are different in that the communication partner selected at S45 is the external device 40 not registered. When a connection with an unregistered device is selected as in this mode, it is desirable to display a dialog screen 142 to inquire the necessity of registration of the user, in combination with a detected device list (cf. FIG. 4(c)), in consideration of occasions of reconnection. The mobile station 10 may also be configured to simultaneously notify the user that the target to which a connection is attempted is not registered, by wording to draw attention.

The other processes at S50 and S52 are the same processes as at S30 and S32, respectively, shown in FIG. 5. The above described the connection procedures of the mobile station 10 with the external devices 20, 30, and 40, but the aforementioned BLUETOOTH connection processes can also be similarly executed between the mobile station 10 and all the external devices detected, without being limited to these external devices described above.

As described above, the mobile station 10 of the present embodiment performs the BLUETOOTH connection with the external device selected as a communication partner by the user of the mobile station 10, out of the plurality of external devices 20, 30, and 40 detected in conjunction with activation of the application. The external devices are generally classified under three types, registered (with a link key), registered (without a link key), and unregistered, depending upon differences of connection records. The mobile station 10 changes the procedure for connection with the external device by BLUETOOTH, according to the security level set in the application activated. Specifically, where the low security level is set in the application, the mobile station 10 omits the processes of device authentication and encryption, irrespective of the differences of connection records. This simplifies the connection procedure and reduces the connection time. When the high security level is set in the application, the mobile station 10 executes the processes of device authentication and encryption, irrespective of the differences of connection records. This circumvents connections with unauthorized third parties and assures predetermined communication security.

Eventually, in developing an application, the security level can be variably set according to a kind of a service implemented by the application. Namely, a developer can develop an application with a security level suitable for an individual service.

The present invention is not limited to the embodiment described above, and can be properly modified in various modification forms, without departing from the spirit and scope of the invention.

For example, in the above embodiment the terminal for changing the display method of the search result according to the security level was the mobile station 10, i.e., the terminal that performed the search by transmission of the search signal. However, the technology of the present invention is also applicable to cases where the mobile station 10 is a terminal that is searched by reception of a transmitted search signal (accept command). In this mode, the mobile station 10 changes a display method of a connection request entity (searching entity) according to the security level.

Specifically, the user of the mobile station 10 registers the propriety of connection for each external device in the case where the high security level is set in an application, as a preliminary process. Here the propriety of connection is whether acceptance of a connection request is to be permitted or rejected, in other words. When an application with the high security level is in action upon being searched, the mobile station 10 ignores a connection request from an external device not permitted to connect by the user, according to the registered content. In contrast to it, when a connection request is received from an external device permitted to connect by the user (e.g., an external device having a connection record at the high security level), the mobile station 10 displays the UI of the external device on the display part 14. On the other hand, when an application with the low security level is in action upon being searched, the mobile station 10 accepts a connection request from all the external devices, regardless of their connection records, and displays UIs of these devices in time series.

This permits the user of the mobile station 10 to readily check the reliability of the communication partner before connection, in accordance with the content of the service provided by the application. Particularly, where the high security level is set in the application, the aforementioned process preliminarily narrows down partners for which the connection request (search) is accepted. For this reason, the number of responses manually sent in response to the request is reduced for the user on the searched side (mobile station 10). This results in reducing the time and effort necessary for establishment of a link between mobile station 10 and an external device.

The above embodiment adopted the authentication process and encryption process based on the input of PIN as means for assuring security at the high level. However, it is also possible to adopt a configuration wherein the mobile station 10 variably sets the propriety of automatic connection and disables the automatic connection only if the high security level is set in the application in action. This gets rid of concern that data is transmitted and received against user's intention between the mobile station 10 and an external device not going through the authentication process.

The mobile station 10 is, for example, a cell phone, but may be any information equipment provided with a communication function, such as a PDA (Personal Digital Assistance) or a PHS, and the function and size thereof do not limit objects to which the present invention is applied.

Furthermore, the above embodiment was configured on the assumption of the BLUETOOTH communication as short-range wireless communication between mobile station 10 and external devices 20, 30, 40. However, it is a matter of course that the present invention is also applicable to infrared communication including IrDA (Infrared Data Association) and to wireless LAN (Local Area Network) communication.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile station comprising:
   means for activating an application of a plurality of applications to communicate with an external device, the mobile station including the plurality of different applications each with respective different high or low security level settings;
   means for acquiring a security level set in the application activated by the activating means;
   means for determining whether connection is possible between the mobile station and the external device prior to connection when the acquired security level indicates the activated application is set to the high security level by comparing a received identifier of the external device to entries stored in a memory of the mobile station identifying a plurality of external devices for which authentication is permitted; and
   means for making a connection with the external device only when the received identifier of the external device matches one of the entries stored in said memory of the mobile station when the acquired security level indicates the activated application is set to the high security level.

2. The mobile station according to claim 1, further comprising:
   means for selecting an external device that can undergo a connection using an application with the high security level,
   wherein when the security level acquired by the means for acquiring is the high security level, the means for making a connection makes the connection with the external device on the occasion of receiving a connection request from the external device selected by the means for selecting.

3. A communication control method comprising the following steps carried out by a mobile station:
   activating an application of a plurality of applications to communicate with an external device, the mobile station including the plurality of different applications each with respective different high or low security level settings;
   acquiring a security level set in the activated application;
   determining whether connection is possible between the mobile station and the external device prior to connection when the acquired security level indicates the activated application is set to the high security level by comparing a received identifier of the external device to entries stored in a memory of the mobile station identifying a plurality of external devices for which authentication is permitted; and making a connection with the external device only when the received identifier of the external device matches one of the entries stored in said memory of the mobile station when the acquired security level indicates the activated application is set to the high security level.

4. A mobile station comprising:

a processor configured to activate an application of a plurality of applications to communicate with an external device, the mobile station including the plurality of different applications each with respective different high or low security level settings;

a first module configured to acquire a security level set in the application activated by the processor;

a second module configured to determine whether connection is possible between the mobile station and the external device prior to connection when the acquired security level indicates the activated application is set to the high security level by comparing a received identifier of the external device to entries stored in a memory of the mobile station identifying a plurality of external devices for which authentication is permitted; and a wireless interface configured to initiate a connection with the external device only when the received identifier of the external device matches one of the entries stored in said memory of the mobile station when the acquired security level indicates the activated application is set to the high security level.

5. The mobile station according to claim 1, further comprising:

means for transmitting a search request to a plurality of external devices based on the activation of the application; and means for receiving a search response request from each of the plurality of external devices in response to the transmitted search request.

6. The mobile station according to claim 5, further comprising:

means for displaying identification information corresponding to each of the plurality of external devices for which a search response request is received.

7. The mobile station according to claim 6, further comprising:

means for receiving an input selecting one of the plurality of external devices displayed at the means for displaying, wherein the means for making a connection makes a connection with the selected external device.

8. The method of claim 3, further comprising:

transmitting a search request to a plurality of external devices based on the activation of the application; and receiving a search response request from each of the plurality of external devices in response to the transmitted search request.

9. The method of claim 8, further comprising:

displaying identification information corresponding to each of the plurality of external devices for which a search response request is received.

10. The method of claim 9, further comprising:

receiving an input selecting one of the plurality of external devices displayed; and making a connection with the selected external device by the procedure according to the acquired security level based on a result of the determining.

11. The mobile station of claim 4, further comprising:

the wireless interface configured to transmit a search request to a plurality of external devices based on the activation of the application, and receive a search response request from each of the plurality of external devices in response to the transmitted search request.

12. The mobile station of claim 11, further comprising:

a display configured to display identification information corresponding to each of the plurality of external devices for which a search response request is received.

13. The mobile station of claim 12, further comprising:

a user interface configured to receive an input selecting one of the plurality of external devices displayed at the display; and the wireless interface configured to make a connection with the selected external device by the procedure according to the acquired security level based on a result of the determining.

* * * * *